Patented Feb. 28, 1928.

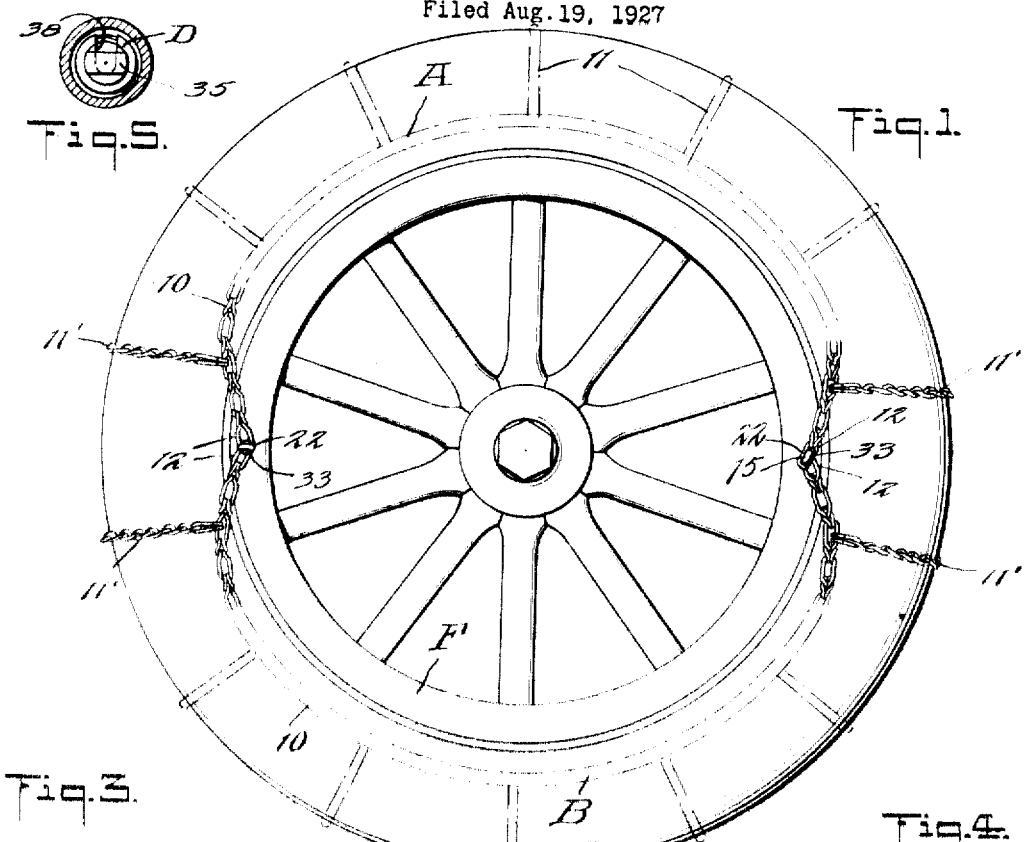
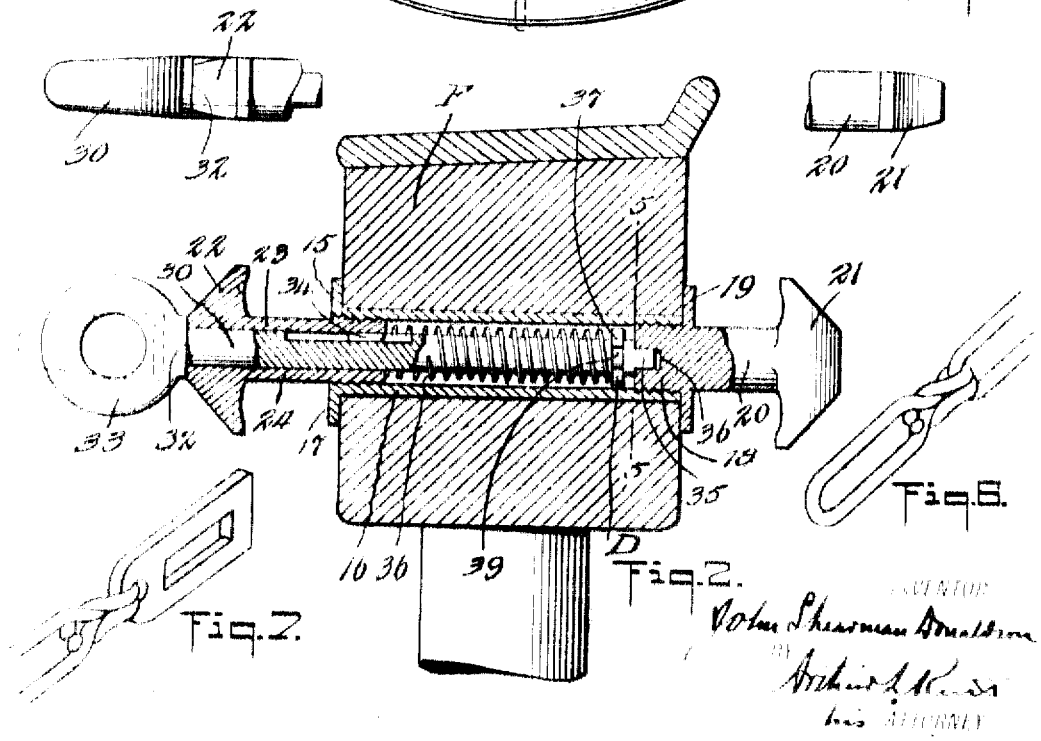

1,660,955

UNITED STATES PATENT OFFICE.

JOHN SHEARMAN DONALDSON, OF NEW YORK, N. Y.

TIRE CHAIN.

Application filed August 19, 1927. Serial No. 214,009.

This invention relates to anti-skid devices for vehicle wheels, and aims to facilitate the attachment of tire chains to automobile wheels and in particular to permit the attachment of tire chains to the wheels of a vehicle which is mired.

Ordinary tire chains include cross or tread pieces extending between two long side pieces which form complete circles at the inner and outer side of the tire when the chain has been attached to a wheel. In order to apply such chains it is necessary either to spread the chains out on the road and drive the vehicle wheel upon them, or to jack up the vehicle wheel so that the chains may be passed under the tire. Consequently, it is impossible to apply such chains to the wheels of the vehicle after the wheels have sunk into mud or other soft material.

In accordance with my invention, the difficulty in applying ordinary tire chains is eliminated by making each side piece of the chain for each wheel in two or more separate pieces, and providing catches on the wheel felly for holding the ends of these side pieces. This makes it possible to apply a tire chain to the upper half of the mired wheel. This, in itself, is often sufficient to enable the vehicle to move itself out of the mud, but, if not, a half rotation of the vehicle wheel permits the application of the remainder of the tire chain so that the wheel may be completely equipped with a chain, notwithstanding the fact that the chain is applied after the wheel has become mired.

In order that my invention may be clearly understood, I will describe in detail the specific embodiment of it, which is shown in the accompanying drawings, in which:

Fig. 1 is an outside view of an automobile wheel showing a non-skid device embodying the invention in the course of an application thereto;

Fig. 2 is a transverse section of the wheel felly showing a sectional view of one of the chain holders of the device;

Fig. 3 is a fragmentary view taken at right angles to Fig. 2 and showing the movable catch;

Fig. 4 is a fragmentary view taken at right angles to Fig. 2 and showing the fixed catch;

Fig. 5 is an inner end view of the locking plunger showing the fixed sleeve in section;

Fig. 6 is a perspective view of the end link of one of the side pieces of one of the chains; and Fig. 7 is a perspective view showing a modified form of end link.

As shown in Fig. 1, I provide for each wheel two separate tire chains A, B, each of which is provided with side pieces 10 and cross-pieces 11. Fig. 1 shows only the side pieces 10 at the outer side of the wheel, but it will be understood that those on the inner side of the wheel are precisely similar. Instead of making all the cross-pieces 11 of the same length as is usual, I may provide cross-pieces 11' of extra length near the end of each pair of side chains 10 so as to permit the end links 12 of the side chains to be drawn inwardly and secured to holders 15 mounted on the felly of the wheel, although these end cross-pieces might be of the same length as the others.

One of the chain holders 15 is illustrated in detail in Figs. 2, 3, 4 and 5. The chain holder includes a sleeve 16 extending transversely through the wheel felly F. At one end of the sleeve 16 is an external flange 17 which bears against the outer face of the wheel felly. A plug 18 screwed into the other end of the sleeve 16, provides a similar flange 19 engaging the inner surface of the wheel felly. The plug 18 provides a shank 20 at the outer end of which is a fixed transverse catch 21. A turnable transverse catch 22 is mounted at the outer end of the sleeve 16. For this purpose a smaller sleeve 23 is loosely screwed into the outer end of the sleeve 16, internal threads on the sleeve 16, and external threads on the sleeve 23 being provided for this purpose. The projecting portion of the sleeve 23 provides a shank 24 which carries the transverse catch 22 at its outer end.

When the holders are applied to the wheel felly, the fixed catch 21 is positioned transversely to the end portions of the side chains when these chains are in their normal position. Thus, in the form shown, the fixed catch 21 is positioned radially with respect to the vehicle wheel. A releasable lock is provided for holding the movable catch 22 parallel to the fixed catch 21. This lock includes a plunger 30 extending through the sleeves 23 and 16. The outer end of the plunger 30 is provided with an enlarged portion having a shoulder 32 which normally engages the outer end of the sleeve 23. At the outer end of said enlarged portion is a handle 33. The sleeve 23 is prevented from turning with respect to the plunger 30, by a spline connection 34 which keeps the handle 33 parallel to the catch 22. At the inner end of the plunger 30, is a transverse projection 35, adapted to engage the transverse groove 36 formed in the inner end of the plug 18. A compression spring 36 re-acting between the inner end of the sleeve 23, and a disk 37 on the plunger, urges the plunger inwardly. To facilitate placing the spring on the plunger in assembling, the disk 37 is provided with a slot 38 which may be slipped upon the circumferential groove 39 in the plunger after the spring has been placed on the plunger.

Each end link of each side piece 10 of the chains is oblong in shape so that it may be slipped over either one of the catches 21, 22 when parallel to the catch. The end link may be made of wire as shown in Fig. 6, or of a stamping, as shown in Fig. 7.

The method of using the chains and holders which have been described is as follows:

The end links of the inner side pieces of one of the chains are first slipped over the fixed catches 21 at the inner side of the wheel felly, so that they engage the shanks 20. This is done while the inner side pieces of the chain are slack so that its end links may be turned parallel to the radial fixed catches 21. The cross-pieces 11 of the chain are then drawn across the tire and the inner side pieces 10 of the chain are pulled tight. The end links of these side pieces are then slipped over the turnable catches 22. To make this possible, the handle 33 is pulled out, freeing the transverse projection 35 from the transverse groove 36, so that the handle and catch 22 may be turned parallel to the end link which is to be slipped over them. After this link has been slipped upon the shank 24, the handle and catch are returned to the radial position. The spring 36 then forces the transverse projection 35 into the transverse groove 36 and locks the catch 22 against turning. The position to which the handle 33 and movable catch 22 are turned to permit the application of the end link of the outer side piece of the upper chain is shown at the right in Fig. 1; while the normal locked position of the handle and movable catch in which the catch securely holds the end link of the chains, is shown at the left hand side of Fig. 1. It will readily be understood that by applying the upper chain first and then rotating the vehicle wheel through 180°, it is possible to apply both chains easily and quickly even though the wheel be mired.

It will readily be understood that various changes may be made without departing from my invention. Thus it is not essential that the side pieces of the chains extend half way around the wheel, nor is it essential that only two chain holders be used.

What I claim is:

1. An anti-skid device for vehicle wheels, comprising a plurality of separate tire chains each comprising two side pieces connected by cross pieces, and each of a length less than the circumference of the wheel, and means mounted on the felly of the wheel and projecting at each side thereof to enter the end link of the inner side piece of one chain and the end link of the inner side piece of the next chain to lock them together and to enter the end link of the outer side piece of one chain and the end link of the outer side piece of the next chain to lock them together.

2. An anti-skid device for vehicle wheels, comprising a tire chain having side pieces connected by cross pieces, oblong links at the ends of both side pieces, shanks projecting inwardly from the inner side of the wheel and adapted to enter the oblong end links of the inner side piece, fixed transverse catches at the outer ends of said shanks lying transversely to the end portions of the side pieces of the chain to prevent the end links of the inner side piece from slipping off said shanks, shanks projecting outwardly from the outer side of the wheel and adapted to enter the oblong end links of the outer side piece, turnable transverse catches on said shanks and releasable means for positively locking said turnable catches parallel to the inner catches.

3. A chain holder for vehicle wheels, comprising a sleeve to extend transversely through the felly of the wheel having a shank extending from one end and a fixed transverse catch on the end of the shank, a turnable transverse catch on a member extending from the other end of said sleeve, and releasable locking means for normally holding the turnable catch parallel to the fixed catch.

4. A chain holder for vehicle wheels, comprising a member extending transversely through the wheel and secured to the felly thereof, a shank extending from one end of said member, a fixed transverse catch at the end of said shank, a shank extending from the other end of said member, a turnable transverse catch on said shank, and releasable locking means for holding the turnable catch parallel to the fixed catch.

5. A chain holder for vehicle wheels, comprising a sleeve extending transversely through the wheel and secured to the felly of the wheel, a fixed plug in the inner end of said sleeve having a transverse groove in its inner end and a transverse catch at its outer end, a second sleeve rotatably mounted in the outer end of the fixed sleeve, means for preventing longitudinal movement of the turnable sleeve, a transverse catch on the turnable sleeve, a locking plunger extending through the sleeves and splined to the turnable sleeve, a transverse projection on the inner end of the plunger adapted to enter the transverse groove in the fixed plug when the turnable catch is parallel to the fixed catch, and a spring normally urging said plunger inward.

6. In a chain holder as claimed in claim 5, a transverse handle on the outer end of the plunger lying parallel to the catch on the turnable sleeve.

In testimony whereof I have hereunto set my hand.

JOHN SHEARMAN DONALDSON.

in the outer end of the fixed sleeve, means for preventing longitudinal movement of the turnable sleeve, a transverse catch on the turnable sleeve, a locking plunger extending through the sleeves and splined to the turnable sleeve, a transverse projection on the inner end of the plunger adapted to enter the transverse groove in the fixed plug when the turnable catch is parallel to the fixed catch, and a spring normally urging said plunger inward.

6. In a chain holder as claimed in claim 5, a transverse handle on the outer end of the plunger lying parallel to the catch on the turnable sleeve.

In testimony whereof I have hereunto set my hand.

JOHN SHEARMAN DONALDSON.

CERTIFICATE OF CORRECTION.

Patent No. 1,660,955.            Granted February 28, 1928, to

JOHN SHEARMAN DONALDSON.

It is hereby certified that error appears in the printed specification of the above numbered patent requiring correction as follows: Page 2, line 103, claim 2, after the word "catches" and before the period insert the words "to prevent the end links of the outer side piece from slipping off said shanks"; and that the said Letters Patent should be read with this correction therein that the same may conform to the record of the case in the Patent Office.

Signed and sealed this 15th day of May, A. D. 1928.

M. J. Moore,
Acting Commissioner of Patents.

(Seal)

CERTIFICATE OF CORRECTION.

Patent No. 1,660,955.                          Granted February 28, 1928, to

JOHN SHEARMAN DONALDSON.

It is hereby certified that error appears in the printed specification of the above numbered patent requiring correction as follows: Page 2, line 103, claim 2, after the word "catches" and before the period insert the words "to prevent the end links of the outer side piece from slipping off said shanks"; and that the said Letters Patent should be read with this correction therein that the same may conform to the record of the case in the Patent Office.

Signed and sealed this 15th day of May, A. D. 1928.

(Seal)                                                        M. J. Moore,
                                                             Acting Commissioner of Patents.